United States Patent
Hellwig et al.

(10) Patent No.: US 9,846,223 B1
(45) Date of Patent: Dec. 19, 2017

(54) SYSTEMS AND METHODS FOR ELECTRONIC WARFARE AUTOMATION AND ROUTING

(71) Applicant: CHESAPEAKE TECHNOLOGY INTERNATIONAL CORPORATION, California, MD (US)

(72) Inventors: Dustan Christopher Hellwig, Monument, CO (US); Matthew Gene Goldsbury, Camarillo, CA (US); Thomas Marshall Tucker, Waxhaw, NC (US)

(73) Assignee: CHESAPEAKE TECHNOLOGY INTERNATIONAL CORPORATION, California, MD (US)

( * ) Notice: Subject to any disclaimer, the term of this patent is extended or adjusted under 35 U.S.C. 154(b) by 742 days.

(21) Appl. No.: 14/208,771

(22) Filed: Mar. 13, 2014

Related U.S. Application Data (60) Provisional application No. 61/799,125, filed on Mar. 15, 2013.

(51) Int. Cl.
*G01S 7/38* (2006.01)
*G05D 1/10* (2006.01)
(Continued)

(52) U.S. Cl.
CPC ............... *G01S 7/38* (2013.01); *G01S 7/021* (2013.01); *G05D 1/10* (2013.01); *G01S 7/2813* (2013.01); *G01S 7/36* (2013.01); *G01S 7/537* (2013.01)

(58) Field of Classification Search
CPC .......... G01S 7/021; G01S 7/2813; G01S 7/36; G01S 7/38; G01S 7/537
(Continued)

(56) References Cited

U.S. PATENT DOCUMENTS 4,581,767 A * 4/1986 Monsen .................. H04K 3/42
324/613
4,729,737 A 3/1988 Reagan et al.
(Continued)

OTHER PUBLICATIONS

"Algorithms for Dynamic 4D (3D Space with Time) Volumetric Calculations and Analysis," URL: www.chesapeaketechnology.com.
(Continued)

*Primary Examiner* — Peter Bythrow
(74) *Attorney, Agent, or Firm* — J.A. Lindeman & Co., PLLC (57) ABSTRACT

Systems, devices, and methods efficiently calculate optimal flight paths for protected entities given terrain data, aircraft position, flight characteristics, and positions of known threat emitters. The systems and methods execute within the mission planning timeline, and the developed processes allow users to retrieve data from the calculations to effectively place an electronic attack platform at the right place and at the right time to be effective. The calculated optimal flight paths are displayed or otherwise visualized in the mission space. Electronic attack jamming capabilities are combined with projected threat emitter performance information in order to obtain optimal geometrical positioning of the electronic attack relative to the threat emitter. Threat emitter system characteristics are combined with electronic attack aircraft capabilities while simultaneously incorporating the position of the protected entity aircraft and rendered to assist the electronic attack aircrew in providing optimal electronic attack capabilities to protect one or more entities.

32 Claims, 6 Drawing Sheets

(51) Int. Cl.
*G01S 7/02* (2006.01)
*G01S 7/537* (2006.01)
*G01S 7/28* (2006.01)
*G01S 7/36* (2006.01)

(58) Field of Classification Search
USPC .................................................. 342/13–20
See application file for complete search history.

(56) References Cited

U.S. PATENT DOCUMENTS

| | | | | |
|---|---|---|---|---|
| 5,278,908 A * | 1/1994 | Parikh | ...................... | H04K 3/41 |
| | | | | 348/E7.065 |
| 5,287,110 A | 2/1994 | Tran | | |
| 5,378,155 A * | 1/1995 | Eldridge | ................... | F41G 3/26 |
| | | | | 340/988 |
| 5,421,728 A | 6/1995 | Milden | | |
| 6,697,008 B1 * | 2/2004 | Sternowski | ........... | G01S 5/0284 |
| | | | | 342/14 |
| 7,427,947 B1 * | 9/2008 | Dark | ....................... | G01S 7/021 |
| | | | | 342/13 |
| 7,478,578 B2 * | 1/2009 | Kirkpatrick | ............. | F41H 11/02 |
| | | | | 244/1 R |
| 7,511,657 B2 * | 3/2009 | Dark | ....................... | G01S 7/021 |
| | | | | 342/13 |
| 7,515,096 B2 * | 4/2009 | Dark | ....................... | G01S 7/021 |
| | | | | 342/13 |
| 7,737,883 B2 * | 6/2010 | Dark | ....................... | G01S 7/021 |
| | | | | 342/13 |
| 7,847,723 B1 * | 12/2010 | Dark | ....................... | G01S 7/021 |
| | | | | 342/13 |
| 7,893,866 B2 * | 2/2011 | Dark | ....................... | G01S 7/021 |
| | | | | 342/13 |
| 2012/0176269 A1 | 7/2012 | Holton et al. | | |

OTHER PUBLICATIONS

ELT EW Operational Support, URL: http://www.elettronica-elt-roma.com/download/EW%20OPERATIONAL%20SUPPORT.pdf.
Kenneth D. Watts: "Electronic Warfare Support Jamming Permission Route Optimization," Naval Postgraduate School, 1997, URL: http://hdl.handle.net/10945/18107.

* cited by examiner

SYSTEMS AND METHODS FOR ELECTRONIC WARFARE AUTOMATION AND ROUTING

CROSS REFERENCE TO RELATED APPLICATION

This application claims benefit of priority of U.S. Provisional Patent Application Ser. No. 61/799,125 filed on Mar. 15, 2013, the entire disclosure of which is incorporated herein by reference.

STATEMENT REGARDING FEDERALLY SPONSORED RESEARCH OR DEVELOPMENT

This invention was made with government support under N68936-11-C-0003 awarded by the Department of Defense. The government has certain rights in the invention.

TECHNICAL FIELD

This technology relates to systems and methods of electronic warfare threat assessment. More particularly, the technology relates to systems, devices, and methods of determining electronic warfare threats, determining jammer acceptability regions, and routing electronic attack aircraft to defend protected entities.

BACKGROUND

Electronic Warfare (EW) tactics are employed by electronic attack (EA) aircraft to transmit electromagnetic energy into a threat radar receiver with sufficient power to prevent the threat radar receiver from accurately detecting or tracking a protected entity aircraft (PE). Electronic warfare includes the basic concepts of noise jamming, deception jamming, and barrage jamming. Noise jamming techniques include the deliberate transmission, re-transmission, or reflection of electromagnetic energy to impair the use of enemy electronic devices, equipment, and systems. Deception jamming techniques include transmitting fake return signals that the enemy accepts as genuine. Successful jamming efforts require generating a jamming signal that exceeds the expected target return signal seen by the enemy (threat) receiver and concentrating the radar jamming signal in the direction of the enemy (threat) receiver antenna. Barrage noise jamming floods the threat radar receiver with massive amounts of electronic emissions over a wide range of frequencies simultaneously and significantly degrades the performance and accuracy of low technology threat receivers.

Advanced radar systems and threat emitters have reduced the effectiveness of noise jamming approaches. The electronic attack aircraft have adapted to advanced technology threat radar emitters by tuning the electronic attack jamming frequency to match the frequency of the threat emitter and to follow any frequency hopping or other frequency agile characteristics the threat emitter may employ. Deception jamming requires the electronic attack platform to generate a signal that is similar to the target return signal the threat receiving system expects to receive while modifying the target characteristics such as return signal strength, range, heading, velocity, and/or acceleration. When the threat includes multiple threat emitters employing advanced radar techniques, it is even more difficult to provide protection jamming to defend protected entities. Cockpit display information and aircrew decision aids are used to improve situational awareness for the electronic attack aircrew. Computer-implemented decision aids incorporating cockpit display information provide additional assistance to the aircrew.

SUMMARY

The systems and methods of the claimed invention compute and determine Jammer Acceptability Regions (JARs). The jammer acceptability regions are the regions within which an electronic attack platform must be placed to achieve maximum effectiveness in support of a protected entity (or entities) given a particular alignment restriction and a selected jamming technique. By computing the "JAR spaces" for a particular mission scenario, an automated (or semi-automated) method for determining optimal positioning for the electronic attack platform can be performed.

The claimed invention combines electronic attack jamming capability with projected threat emitter performance information in order to obtain optimal geometrical positioning of the electronic attack relative to the threat emitter(s). The systems and methods of the claimed invention combine threat emitter system characteristics with electronic attack aircraft capabilities while simultaneously incorporating the position of the protected entity (entities) aircraft on a series of flexibly configurable display formats to assist the electronic attack aircrew in providing optimal electronic attack capabilities.

The claimed invention extends the capabilities for determining optimal positioning and placement for electronic attack platforms to protect one or more entities (protected entities). The systems provide hardware, software, and methods of calculating pre-filter jamming requirements of the electronic attack platform and the protected entity, determining events to incorporate jamming, calculating jamming requirements of the electronic attack platform and the protected entity based on the event and the pre-filter jamming requirements. The methods further include generating a jammer acceptability volume(s) over the event and determining boundaries of the jammer acceptability volume(s). Likewise, the methods include determining a bounded region in the jammer acceptability volume for repositioning the electronic attack platform to provide protection of the protected entity. The methods further include identifying jamming requirements unable to be performed by the electronic attack platform.

The systems and methods of the claimed invention are effective over each assigned protected entity movement vector as long as the capability and acceptability regions are maintained. Likewise, a solution will not be generated if capability and acceptability volumes for the assigned requirements are unable to be maintained.

The systems and methods of the claimed invention also compute electronic attack positioning against known jamming requirements that are not locally computed (e.g., no exposure exists, or protecting an external entity where further information is not provided), assuming a bounding (e.g., minimum power on target, etc.) is provided. The systems and methods of the claimed invention can also compute electronic attack positioning against a jamming requirement that is not computed and without bounding, but effectiveness of the positioning cannot be guaranteed in these cases.

In addition, the systems and methods of the claimed invention determine a pathfinding solution space based on the bounded region(s) and construct a 4-D graph of the pathfinding solution space. The system performs a graph search and/or executes a shortest path algorithm on the constructed 4-D graph and determines a flight path of the electronic attack platform based upon the graph search and/or the shortest path algorithm. In this fashion, the systems and methods of the claimed invention solve positioning requirements of electronic attack platforms against computed jamming requirements. The systems and methods of the claimed invention build a graph (or network) in such a fashion that allows for a significantly reduced solution space and maximizes the graph search same-node comparison that was a significant bottleneck in applying traditional path search solutions.

Further, the system further performs post-processing of the determined flight path of the electronic attack platform based on electronic attack platform performance and feasibility of the determined flight path based on calculations from the post-processing. The system then updates the determined flight path to incorporate the feasibility determination.

System Acceptability Region (SAR)

A System Acceptability Region (SAR) is an extension of the Jammer Acceptability Region (JAR) concept, where contours are determined, visualized, and displayed to show graphical and textual information of threat emitter systems, protected entities, and electronic attack systems. Electronic attack systems provide jamming signals that disrupt the threat emitter systems and allow protected entities to avoid detection by the threat emitter systems. Jammer Acceptability Regions are determined and show multi-dimensional geographical spaces where the electronic attack systems can provide effective jamming of the threat emitter systems.

System Acceptability Regions apply the JAR concept to sensors, kinetic weapon systems, and other non-kinetic weapon systems to model valid positioning of the sensor or weapon system at a point in time. For example, a SAR can be determined for a kinetic weapon system that determines, visualizes, and displays graphical and textual contours depicting acceptable effective regions in which the kinetic weapon can be used against a threat emitter system. The sensors, kinetic weapon systems and other non-kinetic weapon systems can include multiple entities, such as positioning entities and weapons entities. SARs can be modeled in at least 3-dimensions, and may include additional information such as, but not limited to, time, heading, duration and/or spectrum. A SAR can be described or used as a derivative of the full model, including as a parametric model, ground template, or altitude sliced template.

System Capability Region (SCR)

A System Capability Region (SCR) is an extension of the System Acceptability Region and Jammer Capability Region concepts. Similar to Jammer Capability Regions, System Capability Regions constrain the SAR based on positioning system constraints and parent system constraints. Positioning system constraints can include equipment constraints, such as altitude limitations (min/max), speed limitations (min/max), heading limitations, platform orientation at the time of use, theater use constraints, and the like. Parent system constraints can include similar types of constraints as the equipment being used, as well as mission-related constraints including those defined in the rules of engagement, air tasking order, other theater constraints, region constraints, and the like. This constrained region is more effective and efficient in supporting analysis and planning automation than using only acceptability region models. The constrained region is more effective and efficient in supporting analysis and planning automation than using the entire system acceptability region models.

Using Path Search Algorithms for Pathfinding Across 4-D Decision Networks

Path search algorithms, such as A* and D*, are used for pathfinding across spatial (2-D/3-D) datasets. The A* (A-star) algorithm assigns a weight to each open node equal to the weight of the edge to that node plus the approximate distance between that node and the finish. This distance represents a minimum possible distance between that node and the end. The A* path search algorithm eliminates longer path once an initial path is found. For example, if there is a path of length x between the start and finish, and the minimum distance between a node and the finish is greater than x, that node does not need to be examined. D* (D-star) is an incremental search algorithm that makes assumptions about the unknown part of the terrain and finds a shortest path from its current coordinates to the goal coordinates using those assumptions. When it observes previously unknown obstacles, it adds the information to its map and re-plans a new shortest path.

Systems and methods of the claimed invention extend path search functionality into the fourth dimension using a full four dimensional node definition. Brute force techniques of this approach would normally scale far too quickly to be computationally feasible, but the systems and method of the claimed invention implements the path search across a network tree constructed using a 4-D decision network. Systems and methods of the claimed invention use path search algorithms to move spatially across the fourth dimension, creating innovative solutions for complex positioning challenges. For example, systems and methods of the claimed invention are used in positioning a mobile (electronic attack) system in support of another moving (protected) entity, where the supported (protected) entity's movement characteristics can be vastly different than the mobile (electronic attack) system being positioned. Systems and methods of the claimed invention perform this positioning while maintaining traditional A* solution times.

System Maneuver Spaces

Systems and methods of the claimed invention utilize system maneuver spaces that define the volume over which a particular computed solution remains valid from both the perspective of the "protecting" or "performing" system as well as for the "protected" or "passive" platform. An electronic attack system is a protecting and/or performing system, and a protected entity is a protected and/or passive platform. System maneuver spaces can be defined from the perspective of the protecting platform by determining over what volume the protecting platform's current kinetic, non-kinetic, and/or sensor solution remains valid. System maneuver spaces can also be defined from the perspective of the protected entity platform by determining within what volume the protected entity must remain for the support being provided to remain valid. System Maneuver Spaces are used to allow for modification of an optimized route to allow for turns, avoidance, and other spatial modifications to the base solution.

BRIEF DESCRIPTION OF THE DRAWINGS

FIG. 3 is a process flow diagram for determining, visualizing, and displaying system acceptability regions (SARS)

in the electronic warfare automation and routing computer system in accordance with the claimed invention.

DETAILED DESCRIPTION

The claimed invention includes systems, methods, and devices that receive threat radar coverage information from a threat emitter system and transforms that disparate information into graphical displays used by an electronic attack aircrew to safeguard a protected entity (entities). The graphical displays convey information to the aircrew that is used to position the electronic attack aircraft relative to a threat emitter system. A threat emitter system often includes an antenna, a transmitter, a receiver, a mechanism to position the antenna, electronics to process received information, and a user interface.

The electronic attack aircraft transmit electromagnetic energy into the threat emitter receiver with enough power to prevent the threat radar receiver from accurately detecting or tracking the protected entity aircraft. Depending upon the terrain, mission, aircraft and aircrews involved, the electronic attack aircraft can use noise jamming, deception jamming, and barrage jamming techniques. For example, when the noise signal generated by the electronic attack aircraft exceeds the signal return of the protected entity aircraft, the electronic attack aircraft defeats the threat emitter system. Similarly, when the electronic attack aircraft generates a stronger yet similar signal to the actual return signal of the protected entity aircraft while shifting a protected entity aircraft parameter, such as range or speed, the threat emitter system will be deceived, masking the true position of the protected entity. When the electronic attack aircraft generates a jamming signal to mask the true position, speed or course of the protected entity, it degrades acquisition and tracking performance of the threat emitter system.

System Acceptability Region (SAR)

Jammer acceptability regions (JARs) are the regions within which an electronic attack platform must be placed to achieve maximum effectiveness in support of a protected entity (or entities) given a particular alignment restriction and a selected jamming technique. By computing the "JAR spaces" for a particular mission scenario, an automated (or semi-automated) method for determining optimal positioning for the electronic attack platform can be performed.

Figure 3:
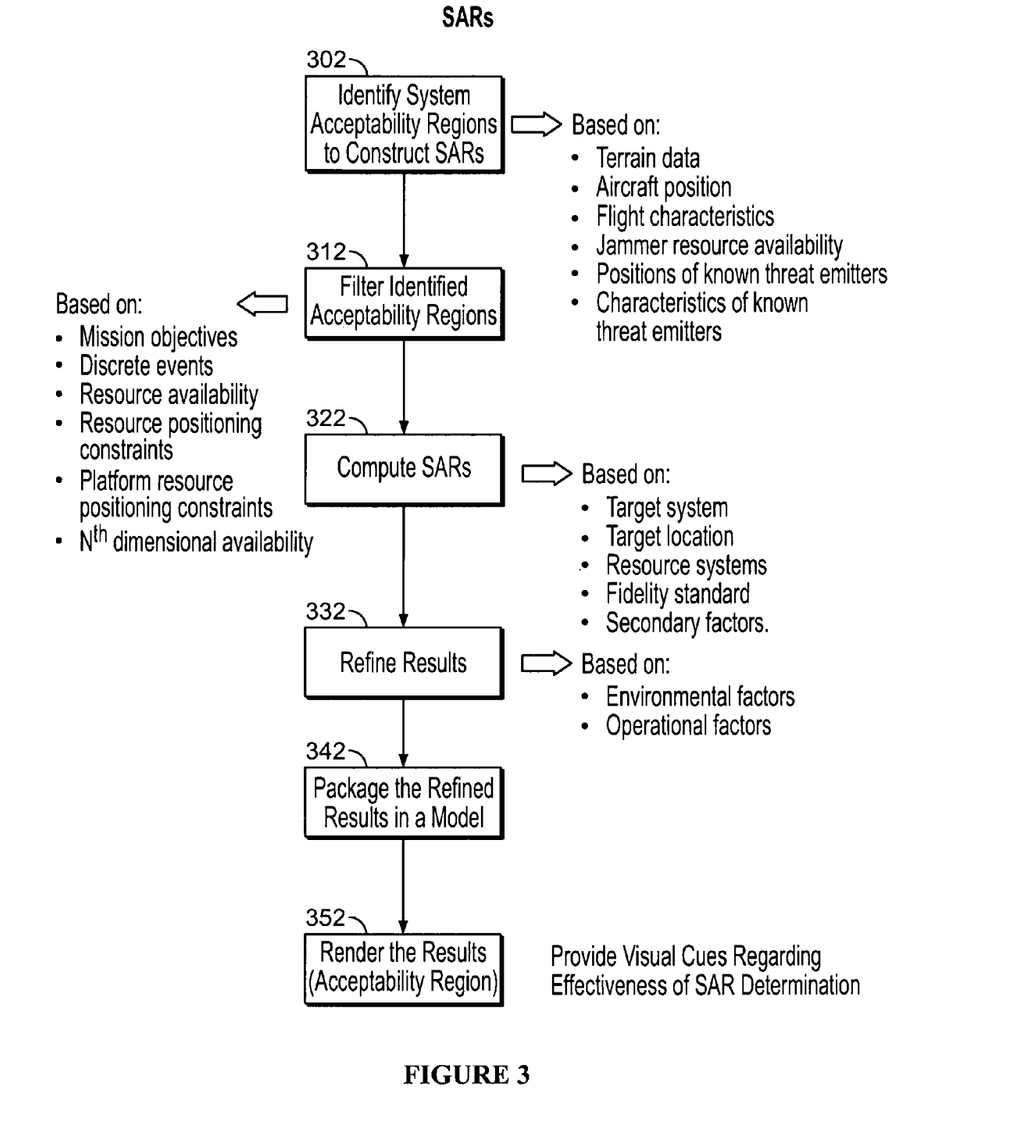

As shown in FIG. 3, a System Acceptability Region (SAR) is an extension of the Jammer Acceptability Region (JAR) concept, where three-dimensional and four-dimensional (with time) spatial boundaries and contours are determined, visualized, and displayed to show graphical and textual information of threat emitter systems, protected entities, and electronic attack systems based on relationships of a number of variables. The systems and methods of the claimed invention also compute electronic attack positioning against known jamming requirements that are not locally computed when a boundary is provided. The claimed invention can also compute electronic attack positioning against a jamming requirement that is not computer and without bounding, but effectiveness of the positioning cannot be guaranteed in these cases. The systems and methods of the claimed invention abstract the protected entities during a pre-filtering stage. Jammer Acceptability Regions are analyzed independent of what protected entity platform generated them, and as such provides one aspect of flattening the solution space.

As shown in block 302 in FIG. 3, the systems and methods of the claimed invention identify SARs to construct based on the type of acceptability region being created. For example, system acceptability regions can apply to sensors, kinetic weapon systems, and other non-kinetic weapon systems to model valid positioning of an electronic attack system with regard to the sensor or weapon system at a point in time. The system acceptability regions construct acceptable regions for the mission craft and equipment by evaluating variables related to the threat emitter systems, protected entities, and electronic attack systems. These variables can include terrain data, aircraft position, flight characteristics, jammer resource availability, positions of known threat emitters, characteristics of the known threat emitters, and the like.

In block 312, the System Acceptability Regions can be filtered based on mission objectives and discrete events. Mission objectives can include kinetic weapon launch, sensor collection, jammer support request, and the like. Discrete events can include exposure to a threat emitter, entry into a threat capability envelope, activation of a threat system, a state change of the resource (protected entity), target system, or related entity, and similar events.

Similarly, the System Acceptability Regions can be filtered based on resource availability, resource positioning constraints, platform-resource combination positioning constraints, and $N^{th}$ dimensional availability.

Once the System Acceptability Regions are identified and filtered, in block 322, the system and method of the claimed invention computes the System Acceptability Regions. The method of computation includes identifying the parametric values of the target system or location, identifying the parametric values of the resource system(s), identifying secondary factors that can scale or modify the results, and calculating the system acceptability region values required to meet a predetermined fidelity standard of the model being created. To identify the parametric values of the target system or location, the system and method of the claimed invention evaluates location characteristics, hardware and software capabilities, properties of direct interaction with related objects and entities, properties of indirect interaction with related objects and entities, existing effects on the target system or location, and the like. Similarly, to identify the parametric values of the resource system, the systems and methods of the claimed invention identify and characterize resource usage characteristics, hardware and software capabilities, properties of direct and indirect interaction with the target system, the resource state at the point in time, and other similar factors.

Secondary factors that can scale or modify the results include environmental or atmospheric phenomena, RF propagation, situational characteristics, as well as unique elements of the resource system and/or the target system or location. The scaled or modified results can be used to calculate the values required to meet the fidelity of model being created. For example, different fidelities can require different levels of scrutiny and different manipulation of the variables outlined above. Multiple computations may be needed in many circumstances, and efficient modeling of the acceptability volume should, in many situations, avoid the use of random point clouds, static grids, or other geometric sampling.

Once the system acceptability regions are calculated, they can be constrained based upon environmental and operational factors as shown in block 332. For example, the system acceptability region can be reduced in size or otherwise altered in shape based upon terrain occulting, third party interference, horizon limitations, temperature, winds, weather effects, and other factors of direct and indirect interference.

The results of the system acceptability region determination and constraints can be used by many information systems in the protected entity and the electronic attack system. In block 342, the results are packaged in a data structure model that takes into account enough information to be validated against the momentary acceptable volume of resource usage. The data structure models can make multiple calculations for the same operation, to capture acceptability ranges for the resource while it is in various potential states of use. Also, the data structure models provide a scalable capability for use, and are not limited to visualization limitations of the system or deployment capability.

In block 352, the data structure models depicting the results of the calculations and constraints can be rendered to provide visual cues that enable the flight crew to ascertain and understand the effectiveness of the system acceptability region determination. The results can be rendered as one or a series of 3-D volumetric shapes along with textual or other visual data to convey additional information. Likewise, the results can be rendered as a ground template, an altitude sliced template, a range ring, or other form of representation of the extreme ranges, and other visual depictions of the system acceptability region.

SARs can be determined for a kinetic weapon system (or other weapon system, sensor, and the like) that determines, visualizes, and displays graphical and textual contours depicting acceptable effective regions in which the kinetic weapon can be used against a threat emitter system. The sensors, kinetic weapon systems and other non-kinetic weapon systems can include multiple entities, such as positioning entities and weapons entities. SARs can be modeled and rendered in at least 3-dimensions, and may include additional information including time, heading, duration, spectrum, as well as other information. A SAR can be described or used as a derivative of the full model, including as a parametric model, ground template, or altitude sliced template.

System Capability Region (SCR)

A System Capability Region (SCR) is an extension of the System Acceptability Region and Jammer Capability Region concepts. Similar to Jammer Capability Regions, System Capability Regions constrain the SAR based on the Positioning system constraints and parent system constraints. As outlined above, positioning system constraints can include equipment constraints, such as altitude limitations (min/max), speed limitations (min/max), heading limitations, platform orientation at time of use, theater use constraints, and the like. Parent system constraints can include similar types of constraints as the equipment being used, as well as mission-related constraints including those defined in the rules of engagement, air tasking order, other theater constraints, region constraints, and the like. This constrained region is more effective and efficient in supporting analysis and planning automation than using only acceptability region models.

Figure 4:
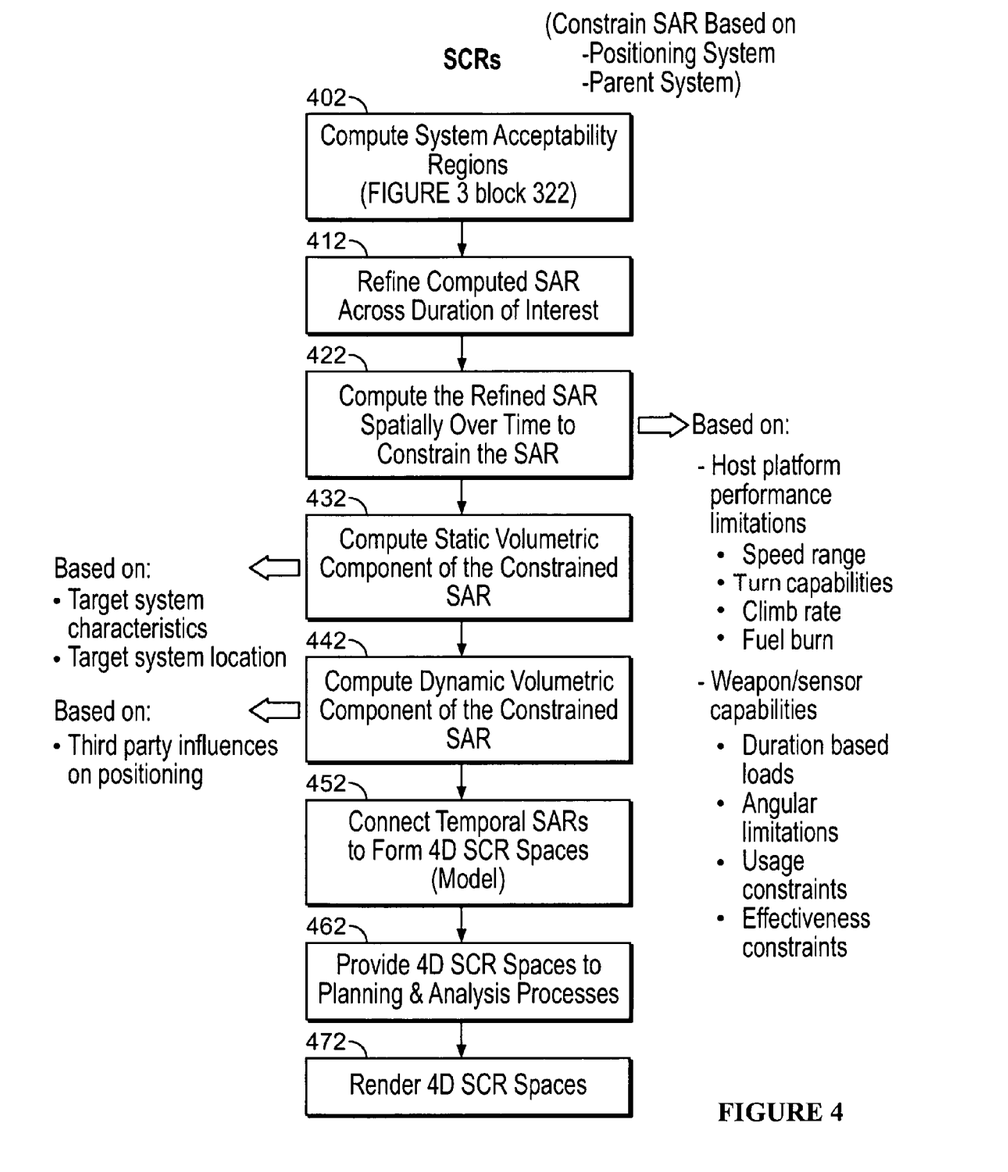
FIG. 4 is a process flow diagram for determining, visualizing, and displaying system capability regions (SCRs) in the electronic warfare automation and routing computer system in accordance with the claimed invention.

As shown in FIG. 4, once the system acceptability regions are computed in block 402, the calculations are refined based on the duration of acceptable action, as shown in block 412. Smeared system acceptability regions can be used to maximize the portability, scalability, and reusability of the process steps. System acceptability regions represent the complete range of acceptable volumes of action against the target system or target location over all valid moments in time (to an acceptable degree of fidelity). The minimum number of system acceptability regions is one, representing a non-changing state over the duration of interest. There are no bounds on the maximum number of system acceptability regions, however the number of system acceptability regions are limited to either discrete changes in environment or contain a minimum threshold of duration between events. The systems and methods of the claimed invention are scalable to planning in support of an unbounded number of protected entities. Computational resources are the limiting factor of the computation space, as opposed to the techniques, processes, and methods performed.

System capability regions adhere to the same filtering constraints of their associated system acceptability regions, due to the existence of system acceptability regions explicitly implying a valid acceptable region at a point in time.

As shown in block 422, to calculate the system capability regions, the system iterates through each system acceptability region, recording the values and rate of change of static and dynamic values from each iteration into the next. The refined SAR can be computed spatially over time to constrain the originally-computed SAR. The original SAR can be refined based on the host platform performance limitations as well as weapons/sensor capabilities. Host platform performance limitations can include the speed range, turn capabilities, climb rate, fuel burn, and the like. Weapon/sensor capabilities can be limited by duration based limits, angular limitations, usage constraints, effectiveness constraints, and the like. Both static and dynamic components can be determined. For example, in block 432, the static volumetric component of the constrained SAR is computed based upon target system characteristics and target system locations, and in block 442, dynamic volumetric components of the constrained SAR can be computed based on third party influences on positioning.

The system identifies "inflection points," where rates of change reverse in scope. The system identifies local minimums within the scope of duration, along with a (predetermined) set minimum from which to base the solution. The process continues by incorporating additional resource information to limit the effective positioning of the platform to iterate forward and backward from the set minimum to identify a capable solution. In block 452, the temporal SARs are connected to model 4D SCR spaces. Once a capable solution is identified, the system capability region can be further modified to meet constraints of the solution space. For example, the system capability region can be further constrained by object avoidance ranges, object avoidance volumes, dimensional positioning constraints, terrain, airspace control, and the like.

Once the system capabilities are determined and constrained, the resulting system capability regions can be modeled. The models can vary based upon their targeted use. For example, single object models can record modified static ranges based upon a maximum rate of change over time. Additionally, single object models can also record modified dynamic ranges assuming a maximum rate of change over time, modified dynamic ranges assuming a reduced effectiveness solution, modified volumetric region assuming minimum and maximum altitude constraints, and other forms of modified volumetric results based on limiting factors. Similarly, multi-object models extend the scope of the single object model into segments, which can be separated by local minima and maxima. Using multi-object models allows the system segregates solution vectors for use based on a change in the rate of change. Multi-object models enable higher algorithms to construct partial or distributed solutions. The systems and methods of the claimed invention build a graph (or network) in such a fashion that allows for a significantly reduced solution space and maximizes the graph search same-node comparison that was a significant bottleneck in applying traditional path search solutions.

In block 462, the modeled 4D SCR spaces can then be provided to planning and analysis processes that are in use on the aircraft. Once provided, the system capability regions can be rendered in a number of different ways, such as with a 3D concave polyhedron as shown in block 472. A 3D concave polyhedron provides an accurate model of the system capability regions. The system capability regions can be rendered as a subset of the system acceptability region volume, or notably the smeared system acceptability region volume. The system capability regions can be rendered with a subset region highlighted, representing the valid portion of the system capability region at a specific moment in time. For example, system capability regions are dimensionally smeared by nature and have a subset that is valid at a given moment in time. Also, even though a point in 3-D space may exist in the system acceptability region at a point in time, it may not be valid at that point in 3-D space within the system capability region context at that point in time.

Using Path Search Algorithms for Pathfinding Across 4-D Decision Networks

Path search algorithms, such as A* and D*, are commonly used for finding a traversable path between nodes in spatial (2-D/3-D) datasets. The system and methods of the claimed invention extends the path search functionality into the fourth dimension using a full four dimensional node definition. Brute force techniques of this approach would normally scale far too quickly to be computationally feasible, but the methods of the claimed invention implements the path search across a network tree constructed using a 4-D decision network. This approach uses a path search algorithm to move spatially across the fourth dimension, creating highly innovative solutions for complex real world positioning challenges (e.g. positioning a mobile system in support of another moving entity, where the supported entities' movement characteristics may be vastly different than the system being positioned) while maintaining traditional A* solution times.

Figure 5:
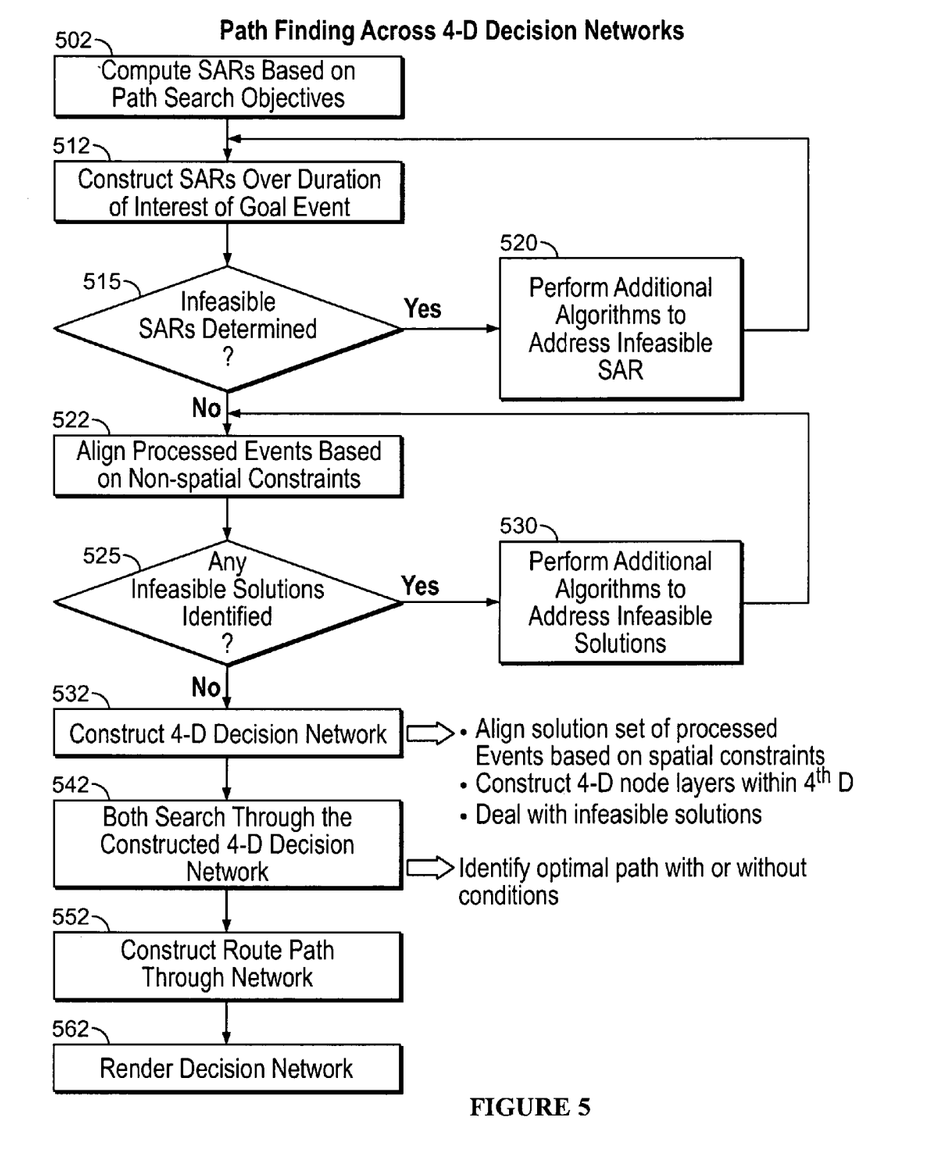
FIG. 5 is a process flow diagram for pathfinding across a 4-D decision network in the electronic warfare automation and routing computer system in accordance with the claimed invention.

As shown in block 502 of FIG. 5, one example method of the claimed invention computes system acceptability regions for objectives and goals attached to the path search. In block 512, the system acceptability regions are constructed over the duration of interest of each objective and/or goal event. If infeasible system acceptability regions are determined in block 515, additional algorithmic guidance is requested (and provided) in block 520. For example, the additional algorithmic guidance can include dropping the objective and/or goal event and proceeding without it or exiting the path search process. The system capability regions are computed for the events or the remaining events, and are constructed over each of the requested events. The system capability regions can also be modified in the event an infeasible system acceptability region is determined. For example, additional algorithmic guidance to the system capability regions can include dropping the objective and/or goal event and proceeding without it, accepting a partial or incomplete solution, or exiting the path search process. Once additional algorithmic guidance is performed to address infeasible SARs, the process returns to block 512 where the SARs are constructed over the duration of interest of the goal event, and the process continues.

Once there are no infeasible SARs in block 515, the processed events are aligned based on non-spatial constraints in block 522, and any infeasible solutions are identified in block 525. Additional processing can be implemented on the infeasible solutions in block 530, including accepting a partial or incomplete solution and exiting the path search process. Once the additional algorithms are implemented to address the infeasible solutions identified, the process returns to block 522 where the processed events are aligned based on non-spatial constraints. Once there are no infeasible solutions in block 525, the alignment process is complete for the synchronous events, and a 4D decision network is constructed in block 532.

To construct a 4D decision network, the solution set of processed events are aligned based on spatial constraints. 4D node layers unique within the 4th dimension are constructed. Connection constraints are determined, and the node layers are connected. If any infeasible solutions are determined, a partial or incomplete solution can be accepted or the path search process can be exited.

Once the 4D decision network is constructed, a path search through the 4D decision network is performed in block 542. An existing or future path search algorithm is used to explore the network, and an optimal path through the network is identified (potentially within an epsilon for weighted solutions). Multiple processes and algorithms can be implemented serially or in parallel to explore the network and identify an optimal path. The processes for determining optimal path traversal take all relevant dimensions into consideration when providing a determination.

Once the path search through the 4D decision network is performed, a route path through the network is constructed in block 552 as the results of the path search are translated into a usable construct.

In block 562, decision networks are rendered as a "flat" 2-D or 3-D network by eliminating the forth dimensional attributes and displaying only the networks spatial attributes. "Flat" networks are those that maintain full 3D attributes, including altitude, within a 3D visualization environment. Fourth dimensional characteristics can be conveyed in a 3D visualization environment using physical characteristics such as line width, colors, and the like or by using different effects such as animation, shading, density, and other volumetric effects. Unique icons and user interface controls are also used to limit and modify the layers shown.

System Maneuver Spaces

System maneuver spaces define the volume over which a particular computed solution remains valid from both the perspective of the "protecting" or "performing" system as well as for the "protected" or "passive" platform. Maneuver spaces can be defined from the perspective of the protecting platform that is concerned with determining the volume over which the protecting platform's current kinetic, non-kinetic, or sensor solution remains valid. Maneuver spaces can also be defined from the perspective of the protected entity platform that is concerned with determining the volume within which the protected entity must remain for the support being provided me to remain valid. System maneuver spaces are used to allow for modification of the optimized route to allow for turns, avoidance, and other spatial modifications to the base solution.

Figure 6:
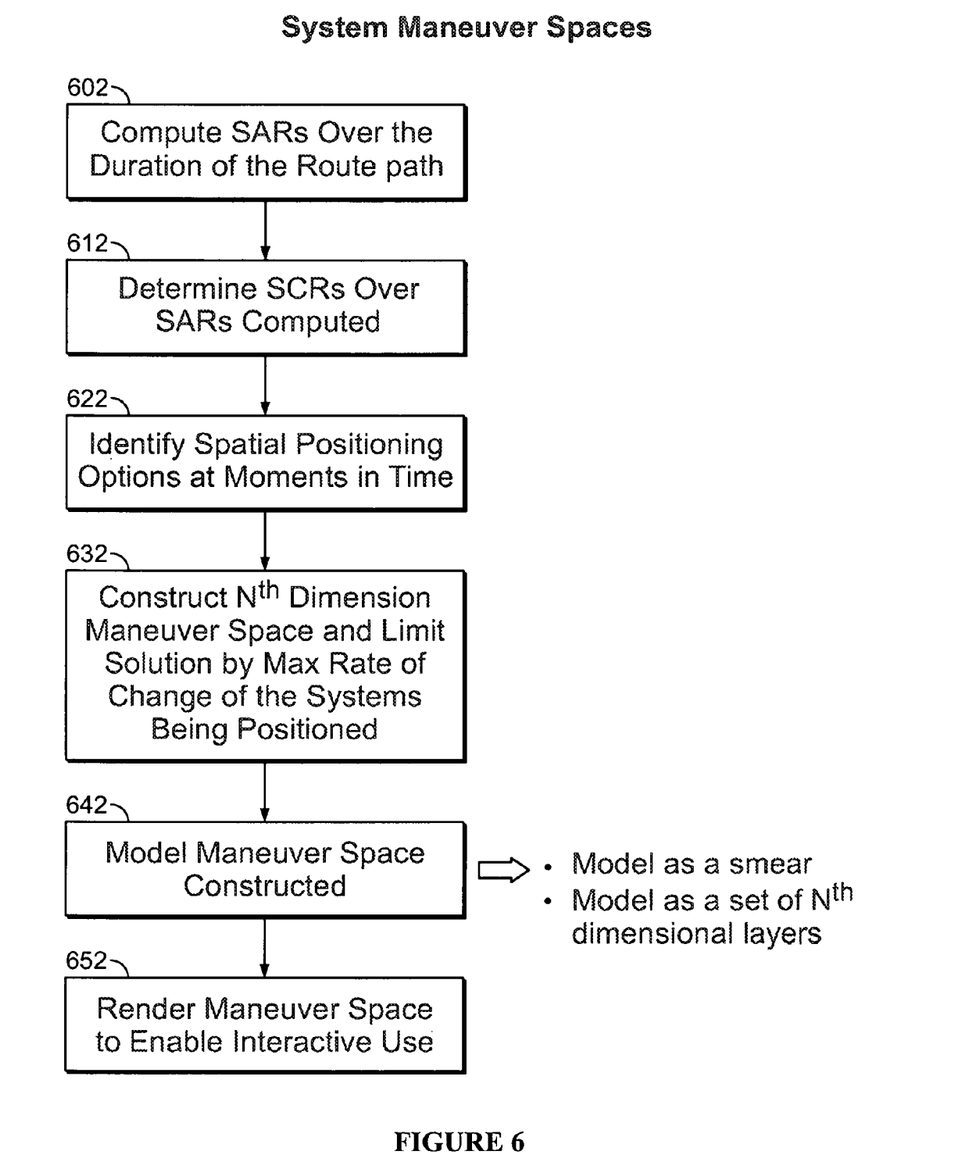
FIG. 6 is a process flow diagram for determining system maneuver spaces in the electronic warfare automation and routing computer system in accordance with the claimed invention.

FIG. 6 illustrates that to determine the system maneuver spaces, the system acceptability regions are computed over the duration of the route path, as in block 602. In block 612, the system capability regions are then determined over all system acceptability regions previously constructed. Spatial positioning options are identified at each moment in time in block 622. Time can be handled by various means, to the level of fidelity required by the system, including but not limited to time slices, discrete events, polling, and the like. Alternate position options are valid if they maintain the Nth dimension attributes, within predetermined bounds, while repositioning in 3-D space.

In block 632, the maneuver space is then computed by constructing the Nth dimension maneuver space and limiting the solution by a maximum rate of change of the systems being positioned. The solution should be valid both forward and in reverse.

In block 642, the maneuver space is constructed. The maneuver space can be modeled as a smear, containing the superset of the spatial positioning options available. The maneuver space can also be modeled as a set of Nth dimensional layers, where Nstorage does not necessarily equal Ncomputation.

Once the maneuver space is constructed, in block 652 the maneuver space can then be rendered as a complex 3-D volume over the duration of the space. The maneuver spaces can be modeled with a subset of the full volume. The subset volume can be rendered and shown independent of the full volume. Additionally, the subset volume can be shown concurrently with the full volume. The subset volume can represent the Nth dimensional characteristics, controlled via the user interface, active state in a simulation, or through real world or external inputs. Maneuver spaces can be modeled through static means, including but not limited to volumes, areas, corridors, and the like.

Maneuver Spaces can be rendered in a fashion to enable interactive usage. The end goal of a maneuver space is to allow editing of a previously defined route path. Automated editing of the maneuver space can utilize visual capabilities, such as OpenCL processing, image analysis, machine learning algorithms, or other visual means of analyzing and automating improvements to a solution. Manual editing implies the use of a human in the loop, whether automation is present or not, in which the visual space allows interactive or other forms of solution updates.

Example Routing and Placement

Using the computer system described below (that is, the electronic warfare automation and routing system shown in FIGS. 1 and 2), the claimed invention determines placement of an electronic attack platform in protecting a protected entity aircraft. As outlined above, more than one protected entity can be "defended against" simultaneously. To determine the placement of an electronic attack platform, the system determines a bounded region to be jammed. To determine the bounded region, the system calculates pre-filter jamming requirements of the electronic attack platform and the protected entity (entities). The system then determines an event in which to incorporate jamming and calculates jamming requirements of the electronic attack platform and the protected entity based on the event and the pre-filter jamming requirements. The system then generates (at least) one jammer acceptability volume over the event and determines boundaries of the jammer acceptability volume. After the jammer acceptability volume is determined and bounded, the system determines a bounded region in the jammer acceptability volume for repositioning the electronic attack platform to provide protection of the protected entity (entities).

In calculating the pre-filter jamming requirements of the electronic attack platform and the protected entity, the system incorporates pre-filter jamming requirements based on terrain obscuration, jammer resource availability, flight restrictions, and/or threat exposure. When determining an event to incorporate jamming, the system considers and identifies when the protected entity is detected by a radar emitter exposure. This evaluation can include computing a maximum detection range at altitude, maximum detection range spheres, and/or beam calculations based on azimuth and elevation stops with independent parametric parameters per beam. Similarly, the evaluation and determination can include identifying points of terrain obscuration during detection and exposure of the protected entity and packaging the identified exposure into vector-based exposure sets that can be used to validate a 4-D solution space solution based on movement vectors of the protected entity.

In generating at least one jammer acceptability volume over the event, the system of the claimed invention can identify at least one capable jammer for the radar emitter generating an exposure and identify available techniques for the identified capable jammer. This identification can include computing a jammer acceptability volume for the jammer technique-radar emitter combination. The computed jammer acceptability volume can be based on initial capture, cross track point, and/or final exposure for each movement vector or total exposure. The identified exposure can includes a time-sequenced exposure based on a local timing mechanism and/or a global timing mechanism.

When determining boundaries of the jammer acceptability volume, the determined boundaries include capability areas and/or capability volumes. When determining a bounded region in the jammer acceptability volume for repositioning the electronic attack platform to provide protection of protected entity, the electronic attack platform can include a vehicle resource, such as an aircraft, for example.

Determining the capabilities of the electronic attack platform includes determining when the electronic attack platform is incapable of performing the required jamming techniques. The system and method of the claimed invention identifies these jamming requirements unable to be performed by the electronic attack platform. This determination can include identifying an area of platform positioning denial, line of sight obscuration, volumetric unacceptability, and/or lack of jammer capability. Once an accurate determination is made, the system can then assign achievable jamming requirements to the electronic attack platform.

After determining placement of the electronic attack platform in protection of the protected entity, the system and method of the claimed invention can determine a pathfinding solution space based upon the bounded region. The pathfinding solution space can include a graph and/or network, by which a graph search algorithm traverses. The system can also align the jamming requirements into concurrent points of interest. For example, the system can identify time-relevant positions of opportunity based on the jammer acceptability volumes and/or the concurrent points of interest.

In addition to aligning the jamming requirements into concurrent points of interest, the claimed invention can analyze concurrent solution requirements, apply capability volumes of the determined boundaries to the concurrent solution requirements, and provide a validated solution based on the applied capability volumes. The process for providing the validated solution can include determining an intersection of concurrent solution requirements and providing a full solution based on the determined intersection of concurrent solution requirements. Likewise, the process for providing the validated solution can also include determining a union of concurrent solution requirements and providing a partial solution based on the determined union of concurrent solution requirements.

The claimed invention can construct a 4-D graph of the pathfinding solution space. The construction of the 4-D graph includes identifying opportunity points in the pathfinding solution space, where the opportunity points are positions in 3-D space that are valid at a specific moment in time. The opportunity points need to be within an acceptability region and within boundaries of a capability region for the exposure that generated the acceptability region. Likewise, the opportunity points need to be within the intersection or the union of aligned jamming requirements outlined above. The method of the claimed invention can then connect the opportunity points based on electronic attack platform capability.

The claimed invention can perform a graph search and/or a shortest path algorithm on the constructed 4-D graph and determine a flight path of the electronic attack platform based upon the graph search and/or the shortest path algorithm. Determining the flight path of the electronic attack platform can include calculating a non-weighted flight path solution and providing an optimal solution for the 4-D-graph based upon the non-weighted flight path solution. Alternatively, determining the flight path of the electronic attack platform can include calculating a weighted flight path solution and providing an optimal solution within an accuracy and performance range based upon the weighted flight path solution. The system and method of the claimed invention can also evaluate movement characteristics of the electronic attack platform.

Additional processing can also be performed. For example, the system can post-process the determined flight path of the electronic attack platform based on electronic attack platform performance, where electronic attack platform performance is based on speed characteristics, fuel characteristics, rate of turn, and/or rate of climb. The system can then determine feasibility of the determined flight path based on calculations from the post-processing and update the determined flight path to incorporate the feasibility determination. The electronic attack platform performance can include platform-specific characteristics and tactics, where the tactics can include orbits, racetracks, and/or platform orientation while performing a task. To refine and revise the calculations and determination, the system can apply an alternate model to the determined flight path of the electronic attack platform and adjust the ground path and altitudes of the electronic attack platform based on the application of the alternate model. The system can then determine feasibility of the alternate model determined flight path and update the determined flight path to incorporate the alternate model feasibility determination.

Once the determinations are made, reviewed, and revised, the model can be sent or otherwise provided to planning and analysis processes that are in use on the aircraft. Once provided to these other processes, the determined models can be rendered in a number of different ways, such as with a 3D concave polyhedron, for example, as discussed above.

Computer System Configured to Calculate and Display Optimal Flight Paths for Protected Entities Systems and methods of the claimed invention correctly and efficiently calculate optimal flight paths for protected entities given terrain data, aircraft position, flight characteristics, and positions of known threat emitters.

Figure 1:
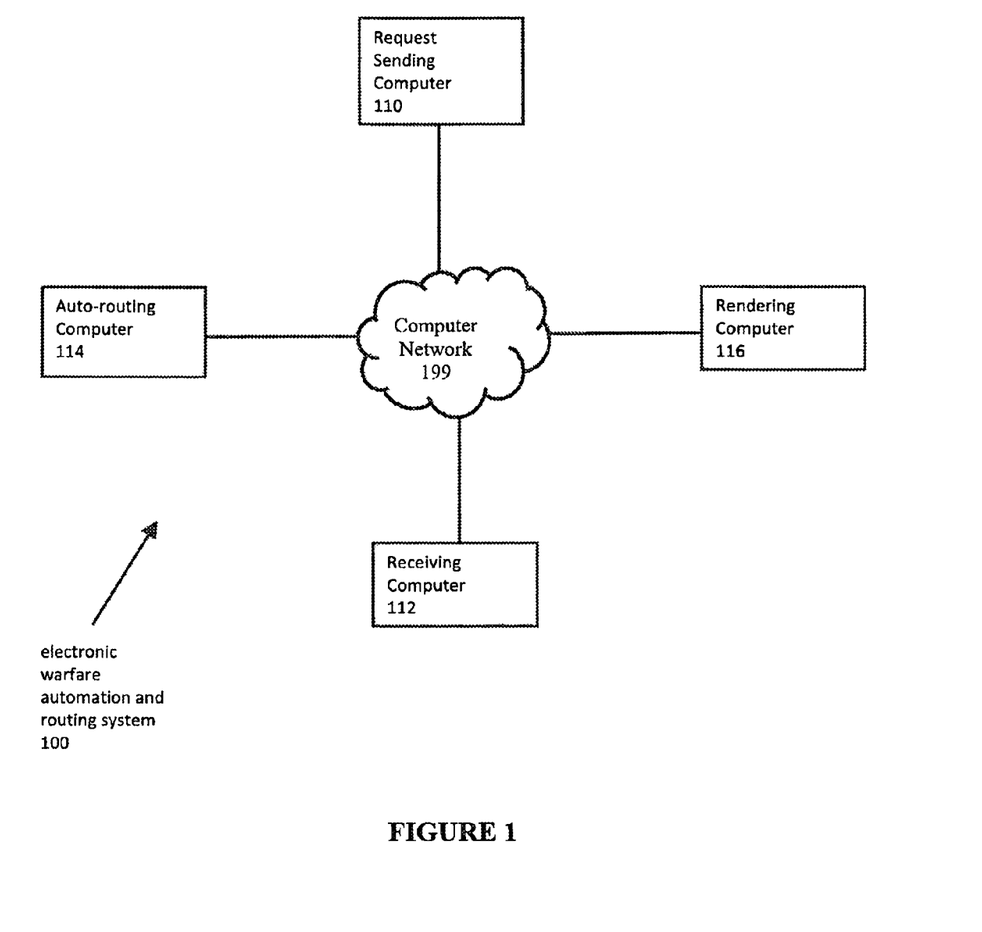
FIG. 1 shows an example electronic warfare automation and routing computer system in accordance with the claimed invention.

As shown in FIG. 1, the electronic warfare automation and routing computer system 100 in the above and below examples can run interface applications such as web browsers and others that can provide an interface to make requests for (and send data to) different web server-based, network computers, and applications via the computer network 199. A series of applications and services can run on the request sending computer 110 and request receiving computer 112 that allow the transmission of data requested by (alternatively) the request sending computer 110 and the request receiving computer 112. Request sending computer 110, request receiving computer 112, auto-routing computer 114, and rendering computer 116 transmit and receive data to and from each other and to and from additional computers that can be accessed via computer network 199. The computers 110, 112, 114, 116 can be viewed as sending computers and receiving computers and can provide data or receive data in response to requests directed toward the respective applications on the respective sites or to the other computers on the computer network 199. While request receiving computer 112, auto-routing computer 114, and rendering computer 116 are shown in FIG. 1, additional computers configured to perform the methods and functions described above can also be used. For simplicity, only computers 110, 112, 114, 116 are shown in FIG. 1. These computers and other computers configured and used in the system to perform the methods of the claimed invention are shown by way of example as sending computer 110 and receiving computer 112.

In accordance with the transmission control protocol (TCP), packets can be sent to the receiving computer 112 from the sending computer 110. The packets from the sending computer 110 and receiving computer 112 can include requests for the transmission of data. It is to be understood that the applications and services on sending computer 110 and receiving computer 112 can be hardware or software and that sending computer 110 and receiving computer 112 can represent sites with a single computing device or sites with multiple computing devices, which can include internal or external networks. The sending computer 110 and receiving computer 112 (and the other computers on computer network 199) are configured to perform the methods and functions described above. Further, additional computers, sites, and servers can be coupled to the computer network 199, and many different types of applications can be available on computers, sites, and servers coupled to the computer network 199. The computer(s) executing the steps of the methods and the functions above are configured to perform these methods and functions.

Generally, client devices such as the sending computer 110 and receiving computer 112 can include any computing device capable of connecting to another computing device to send and receive information, including web-based information. As outlined above, the set of such devices can include devices that typically connect using a wired and/or a wireless communications medium, such as personal computers, desktops, laptops, mobile phones and/or smart phones, and the like. In these examples, the client devices can run web browsers that can provide an interface to make requests to different web server-based applications via the computer network 199. A series of web-based applications can run on the sending computer 110 and receiving computer 112 that allow the transmission of data requested by each other and by other computing devices. The sending computer 110 and the receiving computer 112 can be further configured to engage in a secure communication with other devices coupled to the computer network 199 including additional computers, sites, and servers. Additional secure communications can be effected using mechanisms such as Secure Sockets Layer (SSL), Internet Protocol Security (IPSec), Tunnel Layer Security (TLS), and the like.

In one example, the electronic warfare automation and routing computer system 100 includes sending computer 110 and receiving computer 112, although the system 100 can include other types of private and public networks that include other devices. Communications, such as requests from sending computer 110 and receiving computer 112 and responses from each take place over the computer network 199 according to standard network protocols, such as the HTTP and TCP/IP protocols, but the principles discussed are not limited to this example and can include other protocols.

Further, the system 100 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices can act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the computer network 199 includes any communication medium and method by which data can travel between sending computer 110 and receiving computer 112, and these example configurations are provided by way of example only.

Each of the computers 110, 112, 114, 116 can include a central processing unit (CPU), controller or processor, a memory, and an interface system which are coupled together by a bus or other link, although other numbers and types of each of the components and other configurations and locations for the components can be used.

Figure 2:
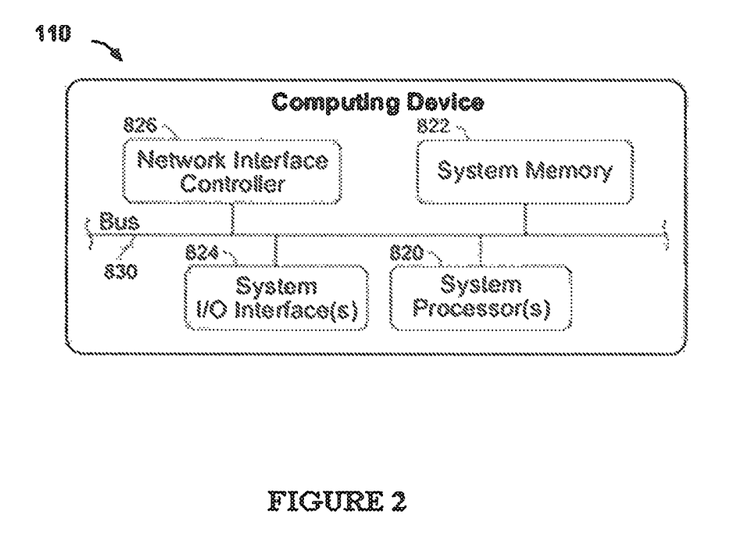
FIG. 2 shows an example computing device in the electronic warfare automation and routing computer system in accordance with the claimed invention.

As shown further in FIG. 2, the electronic warfare automation and routing computer system computing devices of the claimed invention, including sending computer, receiving computer, auto-routing computer, and rendering computer are shown as an example "computing device" 110. Computing device 110 includes system processor(s) 820, system memory 822, system I/O interface(s) 824, and network interface controller 826, which are coupled together by a bus 830 or other numbers and types of links, although the electronic warfare automation and routing computing devices 110 can include other components and elements in other configurations. In this example, the electronic warfare automation and routing computing device 110 is implemented as a standalone device, although the electronic warfare automation and routing computing devices 110 can be implemented as blade devices in a chassis-blade implementation, for example.

System processor 820 includes one or more microprocessors configured to execute computer/machine readable and executable instructions stored in system memory 822 to implement a system and method of electronic warfare automation and routing on a client server network system, such as system 100, for example. When executed by at least one processor, the instructions stored in system memory 822 cause the processor 820 to determine optimal flight paths for protected entities. The instructions on the computer readable medium, including system memory 822, further cause the processor 820 to perform steps including determining a optimal flight paths for protected entities on a sending computer 110 and a receiving computer 112.

The system processor 820 is configured to execute computer/machine readable and executable instructions stored in system memory 822 to implement one or more portions of the processes described above and further below in connection with the other figures, for example, although processor 820 can include other types and/or combinations of processors, such as digital signal processors, micro-controllers, switch chips, bus controllers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated with respect to the other figures.

System memory 822 includes computer readable media, namely computer readable or processor readable storage media, which are examples of machine-readable storage media. Computer readable storage/machine-readable storage media can include volatile, nonvolatile, removable, and non-removable media implemented in any method or technology for storage of information, such as computer readable/machine-executable instructions, data structures, program modules, or other data, which can be obtained and/or executed by one or more processors, such as system processor 820, to perform actions, including implementing an operating system for controlling the general operation of the electronic warfare automation and routing computing device 110 to automatically determine the optimal flight paths for protected entities in accordance with the processes described above in connection with the other figures, for example.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer-executable instructions or other machine-executable instructions, and which can be accessed by a computing or specially programmed device, such as electronic warfare automation and routing computing device 110. When the instructions stored in system memory 822 are run by the system processor 820, the electronic warfare automation and routing computing device 110 implements at least a portion of the processes described above and further below to determine electronic warfare automation and routing in connection with the other figures, in addition to the various client-server management related functions, including redundancy functions, version controls, server load balancing functions, device configuration functions (e.g., defining network security policies), VPN hosting, network traffic management, loss control, and other functions.

System I/O interface(s) 824 includes one or more user input and output device interface mechanisms, such as a computer keyboard, mouse, display device, and the corresponding physical ports and underlying supporting hardware and software to enable the electronic warfare automation and routing computing devices 110 to communicate with the outside environment for accepting user data input and to provide user output, although other types and numbers of user input and output devices can be used. Alternatively or in addition, as will be described in connection with network interface controller 826 below, the electronic warfare automation and routing computing devices 110 can communicate with the outside environment for certain types of operations (e.g., configuration) via a network management port, for example.

Network interface controller 826 provides physical access to a networking medium and provides a low-level addressing system, which enables the electronic warfare automation and routing computing devices 110 to engage in TCP/IP communications over network system 100 (shown above) and to automatically determine optimal flight paths for protected entities and to maintain application services although the network interface controller 826 can be constructed for use with other communication protocols and types of networks, and can include other components, and can perform other functions. Network interface controller 826 is sometimes referred to as a transceiver, transceiving device, or network interface card (NIC), which transmits and receives network data packets to one or more networks, such as system 100 in this example. When the electronic warfare automation and routing computing device 110 includes more than one system processor 820 (or a processor 820 has more than one core), each processor 820 (and/or core) can use the same single network interface controller 826 or a plurality of network interface controllers 826. Further, the network interface controller 826 can include one or more physical ports, such as Ethernet ports, to couple the electronic warfare automation and routing computing devices 110 with other network devices, such as servers and other sites. Additionally, the network interface controller 826 can include certain physical ports dedicated to receiving and/or transmitting certain types of network data, such as device management related data for configuring the electronic warfare automation and routing computing devices 110.

In one example, the network interface controller 826 is an FPGA that can include a local memory and be configured with logic to implement one or more aspects of the technology, including by way of example only, automatically determining optimal flight paths for protected entities, although the network interface controller 826 can include other types of configurable hardware, such as digital signal processors, micro-controllers, ASICs, PLDs, FPLDs, and the like, programmed or configured according to the teachings as described and illustrated herein with respect to the other figures, as well as software executed by the system processor 820, combinations thereof, and other components and elements configured in other manners which could implement one or more aspects of the invention and the technology. The use of specialized hardware in this example allows the network interface controller 826 to rapidly process network data packets.

Bus 830 includes at least one internal device component communication bus, link, bridge and supporting components, such as bus controllers and/or arbiters. These devices enable the various components of the electronic warfare automation and routing computing device 110, such as the system processor 820, system memory 822, system I/O interface 824, and network interface controller 826, to communicate, although the bus 830 can enable one or more components of the electronic warfare automation and routing computing device 110 to communicate with components in other devices as well. By way of example only, example buses include HyperTransport, PCI, PCI Express, InfiniBand, USB, Firewire, Serial ATA (SATA), SCSI, IDE and AGP buses, although other types and numbers of buses can be used, and the particular types and arrangement of buses will depend on the particular configuration of electronic warfare automation and routing computing device 110.

While each of the computers and verification agent can include the processor 820, memory 822, network interface controller 826, and I/O interface 824 coupled together by a bus 830, two or more computing systems or devices can be substituted for any one of the devices in the system 100. Accordingly, principles and advantages of distributed processing, such as redundancy, replication, and the like, also can be implemented as desired to increase the robustness and performance of the devices and systems of the system 100. The system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

As outlined above, each of the client computers, sites, and servers can include a central processing unit (CPU), controller or processor, a memory, and an interface which are coupled together by a bus or other link, although other numbers and types of each of the components and other configurations and locations for the components can be used. The computers are configured to execute the above methods and functions. For example, the processors in the computing devices can execute a program of stored instructions for one or more aspects of the methods and systems as described herein, although the processor could execute other types of programmed instructions. The memory can store these programmed instructions for one or more aspects of the methods and systems as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The user input device can include a computer keyboard and a computer mouse, although other types and numbers of user input devices can be used. The display can include a computer display screen, such as a CRT or LCD screen by way of example only, although other types and numbers of displays could be used.

Although an example of the electronic warfare automation and routing computing devices 110 is described and illustrated in connection with FIG. 2, each of the computers and computing devices of the system 100 (shown in FIG. 1) could be implemented on any suitably configured computer system or computing device. It is to be understood that the example devices and systems of the system 100 are for exemplary purposes, as many variations of the specific hardware and software used to implement the system 100 are possible, as will be appreciated by those skilled in the relevant art(s).

Further, each of the devices of the system 100 can be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

The operation of example processes to provide a system and method of determining optimal flight paths for protected entities, shown in the other figures can be run on the electronic warfare automation and routing system 100. The flow diagrams of the other figures are representative of example machine readable instructions for implementing the process of determining return on learning experience. The steps described above are example machine readable instructions for implementing a method in accordance with the examples described in this disclosure. In one example, the machine readable instructions include an algorithm for execution by: (a) a processor, (b) a controller, and/or (c) one or more other suitable processing device(s). The algorithm can be instantiated in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or in dedicated hardware in a known manner. For example, the algorithm can be implemented by an application specific integrated circuit (ASIC), a programmable logic device (PLD), a field programmable logic device (FPLD), a field programmable gate array (FPGA), discrete logic, etc.). For example, any or all of the components of the electronic warfare automation and routing system could be implemented by software, hardware, and/or firmware. Further, although an example of the claimed invention is described and illustrated herein, persons of ordinary skill in the art will readily appreciate that many other methods of implementing the example machine readable instructions can alternatively be used. For example, the order of execution can be changed, and/or some of the steps described can be changed, eliminated, or combined.

By performing a method of determining optimal flight paths for protected entities, such as aircraft, using an electronic warfare automation and routing system described above, terrain data, aircraft position, flight characteristics, and positions of known threat emitters can be incorporated in the analysis, calculations, and determination of an optimal flight path. The systems and methods execute within the mission planning schedule and timeline and enable users to retrieve data from the flight path calculations to effectively position an electronic attack platform to counter the threat emitter(s). The speed and accuracy of the calculations allows users to place the electronic attack platform at the right place and at the right time to be effective. The calculated optimal flight paths are displayed or otherwise visualized in the mission space.

We claim:

1. A method of determining placement of an electronic attack platform in protection of at least one protected entity, the method comprising:
    calculating pre-filter jamming requirements of the electronic attack platform and the at least one protected entity;
    determining at least one event to incorporate jamming;
    calculating jamming requirements of the electronic attack platform and the at least one protected entity based on the at least one event and the pre-filter jamming requirements;
    generating at least one jammer acceptability volume over the at least one event;
    determining boundaries of the at least one jammer acceptability volume; and
    determining at least one bounded region in the at least one jammer acceptability volume for placing the electronic attack platform to provide protection of the at least one protected entity.

2. The method of determining placement of an electronic attack platform of claim 1, wherein the pre-filter jamming requirements are based on at least one of terrain obscuration, jammer resource availability, flight restrictions, and threat exposure.

3. The method of determining placement of an electronic attack platform of claim 1, wherein determining the at least one event to incorporate jamming includes identifying when the at least one protected entity is detected by at least one radar emitter exposure.

4. The method of determining placement of an electronic attack platform of claim 3, wherein identifying when the at least one protected entity is detected by at least one radar emitter exposure includes computing at least one of a maximum detection range at altitude, maximum detection range spheres, and beam calculations based on azimuth and elevation stops with independent parametric parameters per beam.

5. The method of determining placement of an electronic attack platform of claim 3 further comprising:
    identifying points of terrain obscuration during detection and exposure of the protected entity.

6. The method of determining placement of an electronic attack platform of claim 3 further comprising:
    packaging the identified exposure into vector-based exposure sets that can be used to validate a 4-D solution space solution based on movement vectors of the protected entity.

7. The method of determining placement of an electronic attack platform of claim 3 further comprising:
    identifying at least one capable jammer for the at least one radar emitter generating an exposure.

8. The method of determining placement of an electronic attack platform of claim 7 further comprising:
    identifying available techniques for the at least one identified capable jammer.

9. The method of determining placement of an electronic attack platform of claim 8 further comprising:
    computing a jammer acceptability volume for the jammer technique-radar emitter combination.

10. The method of determining placement of an electronic attack platform of claim 9, wherein the computed jammer acceptability volume is based on at least one of initial capture, cross track point, and final exposure for each movement vector or total exposure.

11. The method of determining placement of an electronic attack platform of claim 7, wherein the exposure includes a time-sequenced exposure based on at least one of a local timing mechanism and a global timing mechanism.

12. The method of determining placement of an electronic attack platform of claim 1, wherein the determined boundaries include at least one of capability areas and capability volumes.

13. The method of determining placement of an electronic attack platform of claim 1, wherein the electronic attack platform includes a vehicle resource.

14. The method of determining placement of an electronic attack platform of claim 1 further comprising:
    identifying jamming requirements unable to be performed by the electronic attack platform.

15. The method of determining placement of an electronic attack platform of claim 14, wherein identifying jamming requirements unable to be performed by the electronic attack platform includes identifying at least one area of platform positioning denial, line of sight obscuration, volumetric unacceptability, and lack of jammer capability.

16. The method of determining placement of an electronic attack platform of claim 14 further comprising:
assigning achievable jamming requirements to the electronic attack platform.

17. The method of determining placement of an electronic attack platform of claim 1 further comprising:
determining a pathfinding solution space based upon the at least one bounded region, wherein the pathfinding solution space includes at least one of a graph or network, by which a graph search algorithm traverses.

18. The method of determining placement of an electronic attack platform of claim 17 further comprising:
aligning the jamming requirements into concurrent points of interest.

19. The method of determining placement of an electronic attack platform of claim 18 further comprising:
identifying time relevant positions of opportunity based on the at least one jammer acceptability volumes and the concurrent points of interest.

20. The method of determining placement of an electronic attack platform of claim 17 further comprising:
analyzing concurrent solution requirements;
applying capability volumes of the determined boundaries to the concurrent solution requirements; and
providing a validated solution based on the applied capability volumes.

21. The method of determining placement of an electronic attack platform of claim 20 further comprising:
determining an intersection of concurrent solution requirements; and
providing a full solution based on the determined intersection of concurrent solution requirements.

22. The method of determining placement of an electronic attack platform of claim 20 further comprising:
determining a union of concurrent solution requirements; and
providing a partial solution based on the determined union of concurrent solution requirements.

23. The method of determining placement of an electronic attack platform of claim 1 further comprising:
constructing a 4-D graph of the pathfinding solution space.

24. The method of determining placement of an electronic attack platform of claim 23, wherein constructing the 4-D graph includes identifying opportunity points in the pathfinding solution space, wherein the opportunity points are positions in 3-D space that are valid at a specific moment in time, and wherein the opportunity points are within an acceptability region, within boundaries of a capability region for the exposure that generated the acceptability region, and within an intersection or union of aligned jamming requirements.

25. The method of determining placement of an electronic attack platform of claim 24 further comprising:
connecting the opportunity points based on electronic attack platform capability.

26. The method of determining placement of an electronic attack platform of claim 23 further comprising:
performing at least one of a graph search and a shortest path algorithm on the constructed 4-D graph; and
determining a flight path of the electronic attack platform based upon the at least one graph search and shortest path algorithm.

27. The method of determining placement of an electronic attack platform of claim 26, wherein determining the flight path of the electronic attack platform includes:
calculating a non-weighted flight path solution; and
providing an optimal solution for the 4-D-graph based upon the non-weighted flight path solution.

28. The method of determining placement of an electronic attack platform of claim 26, wherein determining the flight path of the electronic attack platform includes:
calculating a weighted flight path solution; and
providing an optimal solution within an accuracy and performance range based upon the weighted flight path solution.

29. The method of determining placement of an electronic attack platform of claim 26 further comprising:
evaluating movement characteristics of the electronic attack platform.

30. The method of determining placement of an electronic attack platform of claim 26 further comprising:
post-processing the determined flight path of the electronic attack platform based on electronic attack platform performance, wherein electronic attack platform performance is based on at least one of speed characteristics, fuel characteristics, rate of turn, and rate of climb; and
determining feasibility of the determined flight path based on calculations from the post-processing; and updating the determined flight path to incorporate the feasibility determination.

31. The method of determining placement of an electronic attack platform of claim 30, wherein the electronic attack platform performance includes at least one of platform-specific characteristics and tactics, and wherein tactics includes at least one of orbits, racetracks, and platform orientation while performing a task.

32. The method of determining placement of an electronic attack platform of claim 30 further comprising:
applying an alternate model to the determined flight path of the electronic attack platform; adjusting the ground path and altitudes of the electronic attack platform based on the application of the alternate model;
determining feasibility of the alternate model determined flight path; and
updating the determined flight path to incorporate the alternate model feasibility determination.

* * * * *